United States Patent Office 2,957,030
Patented Oct. 18, 1960

2,957,030
ORGANIC PEROXIDES

Ralph A. Bankert, Wilmington, Del., assignor to Hercules Powder Company, Wilmington, Del., a corporation of Delaware No Drawing. Filed Apr. 25, 1958, Ser. No. 730,761

5 Claims. (Cl. 260—610)

The present invention relates to novel and useful organic peroxides.

In accordance with the present invention, it has been found that organic peroxides of the formula

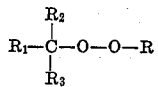

where $R_1$ is an aryl radical, $R_2$ and $R_3$ are selected from the group consisting of hydrogen and alkyl radicals of less than 4 carbon atoms and R is selected from the group consisting of p-menthyl and pinanyl radicals, can be produced by the reaction of an aralkyl alcohol of the general formula

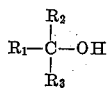

where $R_1$, $R_2$ and $R_3$ are as defined above, with a hydroperoxide having the formula ROOH where R is as defined above. The reaction is catalyzed by an acid-acting condensation catalyst.

The process of the invention is illustrated by the following specific examples in which all parts and percentages are by weight.

EXAMPLE 1

Into a reaction vessel equipped with a reflux condenser, stirrer and thermometer, there was charged 200 parts of α,α-dimethylbenzyl alcohol and 154 parts of 44.7% p-menthane hydroperoxide. Agitation was started and there was added 1 part of p-toluene sulfonic acid monohydrate. The mixture was then heated to 75° C. with continued agitation. Samples of the reaction mixture were removed at intervals for hydroperoxide analyses and the percent hydroperoxide reacted at various times was as follows:

| Time (Hrs.) | Percent ROOH Reacted |
|---|---|
| 1 | 31.4. |
| 4½ | 38.8 Added 1 part of catalyst. |
| 6 | 64.2. |
| 7 | 70.6 Added 2 parts of catalyst. |
| 8 | 81.1. |
| 10 | 86.9. |
| 12 | 89.2 Added 2 parts of catalyst. |
| 15 | 93.2. |

The reaction mixture was allowed to cool to room temperature and was washed with fifteen 100-part portions of aqueous 10% sodium hydroxide and nine 50-part portions of water. The volatiles were next removed by heating the reaction product to 55° C. at a reduced pressure of 0.03 mm. of mercury while sparging with nitrogen. The residue amounted to 145.7 parts. Analysis of this product indicated the presence of 0.6% p-menthane hydroperoxide by the polarograph and 1.84% peroxide active oxygen by an iodine liberation method. This latter value indicates the presence of 36.15% p-menthyl (α,α-dimethylbenzyl) peroxide, a conversion of 47.9%.

The method of analysis for the total peroxy compounds was essentially that of Wagner, Smith and Peters, Analytical Chemistry 19, 976–9 (1947), in which iodine liberated from sodium iodide is titrated, with the modification in that concentrated hydrochloric acid was added to hydrolyze the peroxide so that all of the peroxy compounds reacted with the sodium iodide with liberation of titratable iodine.

EXAMPLE 2

Into the same reaction vessel employed in Example 1, there was charged 97.3 parts of 44% p-menthane hydroperoxide and 127.5 parts of α,α-dimethylbenzyl alcohol at room temperature. This mixture was stirred and there was added dropwise over a period of 3 minutes 2.4 parts of $BF_3$-ethyl ether complex dissolved in 9 parts of benzene.

The resulting mixture was heated to 76° C. over a period of 19 minutes and this temperature maintained for 45 minutes. Analysis at this point indicated that 94.6% of the hydroperoxide had reacted. The reaction mixture was cooled to room temperature, diluted with 140 parts of petroleum ether and washed with four 100-part portions of aqueous sodium hydroxide solution and four 100-part portions of water. All volatile material was removed by distillation at a temperature of 90° C. and at a pressure of 0.1 mm. of mercury while sparging with nitrogen. The undistilled residue amounted to 68.3 parts. Analyses by the iodine liberation method indicated the presence of 2.02% p-menthane hydroperoxide and 3.82% peroxide active oxygen. This latter value indicated the presence of 69.2% p-menthyl (α,α-dimethylbenzyl) peroxide, a conversion of 65.2%.

A 19 x 1¾ inch chromatographic column was packed with silica gel (mesh size—thru 200). Onto the column was placed a solution of 11 g. of the above residue diluted with an equal volume of n-hexane. The material was eluted with three 500-ml. portions of hexane, three 400-ml. portions of 50:50 (by volume) mixture of benzene-hexane, and finally 400 ml. of benzene. The solvents were stripped from the eluates by heating in a water bath to a final pot temperature of 55–60° C./11–14 mm. while sparging with nitrogen. The products isolated from these eluates were as follows:

| Portion of eluate: | Weight of product (g.) |
|---|---|
| 1 (hexane) | 0.1 |
| 2 (hexane) | 0.1 |
| 3 (hexane) | 0.4 |
| 4 (benzene-hexane) | 0.3 |
| 5 (benzene-hexane) | 9.0 |
| 6 (benzene-hexane) | 0.7 |
| 7 (benzene) | 0.2 |

A 7.1 g. sample of the product from eluate No. 5 was put through a 100-stage Craig countercurrent extraction apparatus [J. Anal. Chem. 23, 1236 (1951)] using isooctane and acetonitrile as the solvent pair. A peak representing approximately 80% of the charge was obtained in the weakly polar end of the profile. The solvent from the combined cuts representing this peak was stripped by heating to a pot temperature of 60° C./0.8 mm. while sparging with nitrogen. The undistilled product, a faintly yellow oil, weighed 5 g. Analytical results for this product are as follows:

|  | Found | Calculated for $C_{19}H_{30}O_2$ |
|---|---|---|
| Carbon, Percent | 78.57, 79.15 | 78.57 |
| Hydrogen, Percent | 10.79, 10.56 | 10.41 |
| Direct Oxygen, Percent | 10.71 | 11.02 |
| Molecular Weight | 299, 303 | 290.4 |
| $n_D^{20}$ | 1.4940 | |

The product was analyzed by ultraviolet absorption and the results were as follows:

$\alpha$ at 258 m$\mu$ p-Menthyl($\alpha,\alpha$-dimethylbenzyl) peroxide _____ 0.78
Bis($\alpha,\alpha$-dimethylbenzyl) peroxide (standard) ____ 1.57

It had been anticipated that the p-menthyl($\alpha,\alpha$-dimethylbenzyl) peroxide would have half the absorbence of bis($\alpha,\alpha$-dimethylbenzyl) peroxide since the p-menthane portion of the molecule should have no ultraviolet absorption. These results were obtained. Additionally, infrared absorption analysis showed that the product had a different infrared spectrum from that of bis($\alpha,\alpha$-dimethylbenzyl) peroxide. The logical conclusion from the preceding evidence is that the product is p-menthyl ($\alpha,\alpha$-dimethylbenzyl) peroxide.

EXAMPLE 3

Into the same reaction vessel employed in Example 1 there was placed 128 parts of 65–70% pinane hydroperoxide, 120 parts of $\alpha,\alpha$-dimethylbenzyl alcohol and 2.5 parts of p-toluene sulfonic acid monohydrate. The mixture was stirred and heated to 75° C. and this temperature maintained for 32.5 hours. Additional 2.5 part portions of the catalyst were added at the end of 14.5, 20.5 and 26.5 hours. At the conclusion of the heating period, it was found that 90.3% of the hydroperoxide had reacted. The reaction mixture was diluted with 108 parts of isopropyl ether, washed with two 50-part portions of aqueous 5% sodium hydroxide and then washed with water until neutral. The ether solution was dried and the ether removed by evaporation to yield 164 parts of product. Analysis of the product indicated the presence of 4.4% pinane hydroperoxide and 9.9% pinanyl ($\alpha,\alpha$-dimethylbenzyl) peroxide. The latter represents a conversion of 11.3%.

EXAMPLE 4

Into the same reaction vessel employed in Example 1, there was charged 90.5 parts of 47.5% p-menthane hydroperoxide and 146.3 parts of $\alpha,\alpha$-p-trimethylbenzyl alcohol at room temperature. This mixture was stirred and there was added dropwise over a period of 6 minutes 2.4 parts of BF$_3$-ethyl ether complex dissolved in 9 parts of benzene.

The resulting mixture was heated to 74° C. over a period of 18 minutes and a temperature of 74–78° C. maintained for 45 minutes. Analysis at this point indicated that 96.5% of the hydroperoxide had reacted. The reaction mixture was cooled to room temperature, diluted with 175 parts of petroleum ether and then washed with four 100-part portions of aqueous 10% sodium hydroxide solution and four 100-part portions of water. All volatile material was removed by distillation at a temperature of 88° C. and at a pressure of 0.1 mm. of mercury while sparging with nitrogen. The undistilled residue amounted to 93.1 parts. Analyses by the iodine liberation method indicated the presence of 1.16% p-menthane hydroperoxide and 3.00% peroxide-active oxygen. This latter value indicated the presence of 57% p-menthyl ($\alpha,\alpha$-p-trimethylbenzyl) peroxide, a conversion of 69.9%.

EXAMPLE 5

Into the same reaction vessel employed in Example 1, there was charged 90.5 parts of 47.5% p-menthane hydroperoxide and 101.5 parts of p-isopropyl-$\alpha,\alpha$-dimethylbenzyl alcohol at room temperature. This mixture was stirred and there was added dropwise over a period of 7 minutes 4.8 parts of BF$_3$-ethyl ether complex dissolved in 9 parts of benzene.

The resulting mixture was heated to 72° C. over a period of 10 minutes and a temperature of 72–76.5° C. maintained for 45 minutes. Analysis at this point indicated that 98.5% of the hydroperoxide had reacted. The reaction mixture was cooled to room temperature, diluted with 140 parts of petroleum ether and washed with five 100-part portions of aqueous 10% sodium hydroxide solution and three 100-part portions of water. All volatile material was removed by distillation at a temperature of 89° C. and at a pressure of 0.06 mm. of mercury while sparging with nitrogen. The undistilled product amounted to 107 parts. Analyses by the iodine liberation method indicated the presence of 0.51% p-menthane hydroperoxide and 2.82% peroxide-active oxygen. This latter value indicated the presence of 58.5% p-menthyl (p-isopropyl-$\alpha,\alpha$-dimethylbenzyl) peroxide, a conversion of 75.4%.

EXAMPLE 6

Into the same reaction vessel employed in Example 1, there was charged 60.7 parts of 64.8% pinane hydroperoxide and 127.5 parts of $\alpha,\alpha$-dimethylbenzyl alcohol at room temperature. This mixture was stirred and there was added dropwise over a period of 15 minutes 4.8 parts of BF$_3$-ethyl ether complex dissolved in 9 parts of benzene.

The resulting mixture was heated to 74° C. over a period of 15 minutes and the temperature was held at this point for one hour. Analysis at this point indicated that 95.8% of the hydroperoxide had reacted. The reaction mixture was cooled to room temperature, diluted with 140 parts of petroleum ether and then washed with six 100-part portions of aqueous sodium hydroxide solution and four 100-part portions of water. All volatile material was removed by distillation at a temperature of 87° C. and at a pressure of 0.04 mm. of mercury while sparging with nitrogen. The undistilled residue amounted to 69 parts. Analyses by the iodine liberation method indicated the presence of 2.92% pinane hydroperoxide and 3.25% peroxide-active oxygen. This latter value indicated the presence of 58.4% pinanyl ($\alpha,\alpha$-dimethylbenzyl) peroxide, a conversion of 60.6%.

EXAMPLE 7

Into the same reaction vessel employed in Example 1 there was placed 65.5 parts of 64.8% pinane hydroperoxide and 100 parts of $\alpha,\alpha$-p-trimethylbenzyl alcohol at room temperature. This mixture was stirred and there was added dropwise over a period of 9 minutes 4.8 parts of BF$_3$-ethyl ether complex dissolved in 9 parts of benzene.

The resulting mixture was heated to 75° C. over a period of 14 minutes and a temperature of 75–79.5° C. maintained for one hour. Analysis at this point indicated that 93.8% of the hydroperoxide had reacted. The reaction mixture was cooled to room temperature, diluted with 175 parts of petroleum ether and washed with five 100-part portions of aqueous 10% NaOH solution and three 100-part portions of water. All volatile material was removed by distillation at a temperature of 87° C. and at a pressure of 0.1 mm. of mercury while sparging with nitrogen. The undistilled residue amounted to 85.2 parts. Analyses by the iodine liberation method indicated the presence of 2.62% pinane hydroperoxide and 2.01% peroxide-active oxygen. This latter value indicated the presence of 37.9% pinanyl ($\alpha,\alpha$-p-trimethylbenzyl) peroxide, a conversion of 42.8%.

A 20 g. sample of the above residue was put through the 100-stage Craig countercurrent extraction apparatus using isooctane and acetonitrile as the solvent pair. Three peaks were obtained in the weakly polar end of the profile. Peak C represented 15.8% of the original sample, peak D represented 9.2% and peak E represented 65%. The solvents from the combined cuts for the respective peaks were stripped by heating to pot temperatures of 55° C./1 mm. while sparging with nitrogen. The undistilled products, faintly yellow oils, from peaks C, D and E weighed 1.61 g., 3.02 g. and 11.71 g., respectively. Analytical results for these products are as follows:

|  | Found for Product from— | | | Calcd. for $C_{20}H_{30}O_2$ |
|---|---|---|---|---|
|  | Peak C | Peak D | Peak E |  |
| Carbon, Percent | 78.83, 78.67 | 87.49, 87.68 | 80.36 | 79.42 |
| Hydrogen, Percent | 9.58, 9.26 | 9.48, 9.67 | 10.57 | 10.00 |
| Direct Oxygen, Percent | 11.13 | 3.47 | 10.03 | 10.58 |
| $n_D^{20}$ | 1.5265 | 1.5518 | 1.5156 | |

The above data furnish reasonable evidence that the product from peak E is pinanyl($\alpha,\alpha$-p-trimethylbenzyl) peroxide of relatively high purity.

EXAMPLE 8

Into the same reaction vessel employed in Example 1, there was charged 66.7 parts of 64.8% pinane hydroperoxide and 100.5 parts of p-isopropyl-$\alpha,\alpha$-dimethylbenzyl alcohol at room temperature. This mixture was stirred and there was added dropwise over a period of 9 minutes 4.8 parts of $BF_3$-ethyl ether complex dissolved in 9 parts of benzene.

The resulting mixture was heated to 75° C. over a period of 9 minutes and a temperature of 75–77.5° C. maintained for 45 minutes. Analysis at this point indicated that 95.7% of the hydroperoxide had reacted. The reaction mixture was cooled to room temperature, diluted with 140 parts of petroleum ether and then washed with eight 100-part portions of aqueous 10% sodium hydroxide solution and three 100-part portions of water. All volatile material was removed by distillation at a temperature of 85° C. and at a pressure of 0.05 mm. while sparging with nitrogen. The undistilled residue amounted to 98.9 parts. Analyses by the iodine liberation method indicated the presence of 1.98% pinane hydroperoxide and 2.00% peroxide-active oxygen. This latter value indicated the presence of 41.2% pinanyl (p-isopropyl-$\alpha,\alpha$-dimethylbenzyl) peroxide, a conversion of 48.7%.

EXAMPLE 9

The peroxides of the invention have been found to be outstanding in their utility as vulcanizing agents for both natural and synthetic rubbers. This was demonstrated by blending the product of Example 1 in an amount equal to 2.15 parts of p-menthyl-($\alpha,\alpha$-dimethylbenzyl) peroxide with a blend of 100 parts of GR–S 1500 and 50 parts high abrasion furnace black on a two-roll rubber mill. In the milling operation roll temperatures were maintained between 80° and 100° F. and, after the addition of peroxide, the composition was intimately mixed by cross-cutting and end-rolling six times. The sheet so produced was allowed to stand overnight and was refined the following morning by passing through tightly closed rolls six times. The compounded sheet was then put back on the roll and allowed to roll with a free rolling nip for several minutes to establish the mill direction, after which it was sheeted from the mill at a thickness of about 0.085 inch. The sheeted stock was allowed to stand at room temperature for one hour and was then vulcanized in a preheated 4-cavity 6 x 5 x 0.75 inch mold maintained at 300° F. for periods of 7.5, 15, 30, 45, 60 and 90 minutes. Three type "C" tensile specimens were cut from each sheet and evaluated for unaged tensile properties according to ASTM D412–492. Mooney Scorch determinations were also made on the compounded, uncured stock according to ASTM D1077–419. The results are presented in the following table:

Table I

| | | Cure Time, Min. at 300° F. | |
|---|---|---|---|
| Mooney Scorch—MS rotor, min. to 10-point rise at 250° F | | | 17 |
| Modulus at 300% Elongation | | 7½ | 1,825 |
| | | 15 | |
| | | 30 | |
| Tensile Strength, p.s.i. | | 7½ | 3,070 |
| | | 15 | 2,770 |
| | | 30 | 2,410 |
| | | 45 | 2,430 |
| | | 60 | 1,650 |
| | | 90 | 1,830 |
| Elongation, percent | | 7½ | 450 |
| | | 15 | 270 |
| | | 30 | 170 |
| | | 45 | 170 |
| | | 60 | 150 |
| | | 90 | 140 |
| Shore $A_2$ Hardness | | 7½ | 56 |
| | | 15 | 63 |
| | | 30 | 68 |
| | | 45 | 69 |
| | | 60 | 70 |
| | | 90 | 71 |
| Bashore Resilience | | 7½ | 48 |
| | | 15 | 48 |
| | | 30 | 50 |
| | | 45 | 49 |
| | | 60 | 50 |
| | | 90 | 49 |
| Minutes to Reach Optimum Cure | | | 7½ |

The above procedure was repeated using in place of the crude peroxide of Example 1 the purified peroxide of Example 2 in the amount of 2.15 parts. The physical property data of the final vulcanizate were the same within experimental error.

The different peroxides prepared by the other examples when used in the same manner to vulcanize rubber resulted in the production of vulcanizates of comparative quality to the ones described above.

As has been demonstrated by the examples, the peroxides of this invention can be prepared by a condensation reaction between an alcohol of the formula

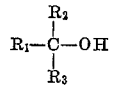

and a hydroperoxide of the formula ROOH wherein R, $R_1$, $R_2$ and $R_3$ are as previously defined.

The aryl group, $R_1$, referred to in the preceding formula can be, for example, phenyl, naphthyl, anthryl, phenanthryl and the like. This aryl group can contain alkyl substituents as in the case of methylphenyl, ethylphenyl, propylphenyl, isopropylphenyl, butylphenyl, isobutylphenyl, dimethylphenyl, methylethylphenyl, etc., and corresponding alkyl derivatives of the other aryl groups mentioned. The term "aryl" as used herein thus includes alkaryl groups in which the alkyl substituent in the aryl group contains less than 4 carbon atoms and may be the same as or different from $R_2$ and $R_3$. The phenyl group is the preferred aryl radical.

The groups $R_2$ and $R_3$, referred to in the preceding formula can be hydrogen or an alkyl group of less than 4 carbon atoms. Representative of such alkyl groups are methyl, ethyl, propyl and isopropyl.

Typical alcohols of the formula:

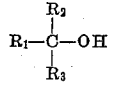

which can be used to produce the peroxides of the invention are (in addition to α,α-dimethylbenzyl alcohol) α-methylbenzyl alcohol, α,α-dimethyl-p-methylbenzyl alcohol and α,α-dimethyl-p-isopropylbenzyl alcohol.

The p-menthane hydroperoxide utilized in the preparation of the peroxides of the invention is a commercially available material well known in the art and is prepared by the air oxidation of p-menthane. Chemically, it consists essentially of a mixture of isomeric hydroperoxides in proportions not yet established as represented by the structural formula:

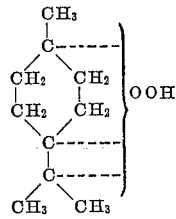

As it comes into commerce, p-menthane hydroperoxide is a crude material containing from about 44 to 53% hydroperoxide with the balance being predominantly p-menthane and other oxidation products. In accordance with the preceding description, the term "p-menthyl" is used herein as generically representative of the isomeric radicals which are derived from p-menthane by the removal of a hydrogen atom from one of the three tertiary carbon atoms of that compound.

The pinane hydroperoxide utilized in the examples is a crude material prepared by air oxidation of pinane and is described by Fisher et al., J. Am. Chem. Soc., 75, 3675 (1953). The crude material consists essentially of a hydroperoxide of the formula

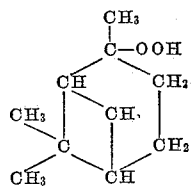

in the amount indicated by the examples with the balance being other oxidation products.

The condensation of the hydroperoxide with the alcohol is carried out in the presence of a catalytic amount, ranging from about 0.05 to 5%, of an acid-acting condensation catalyst based on the weight of the alcohol, and the temperature used is desirably between 20° and 100° C. Boron trifluoride is the preferred catalyst. Other acid-acting catalysts which can be used are the mineral acids, the acid clays and organic sulfonic acids such as p-toluene sulfonic acid.

The molar ratio of alcohol to hydroperoxide can range from about 1:1 to 3:1. An inert solvent such as benzene or hexane may be employed to facilitate control of the reaction but is not necessary as the examples have demonstrated.

In addition to the foregoing method of preparation, peroxides in which R is p-menthyl can be prepared by reacting a dihydro terpineol with a hydroperoxide of the formula:

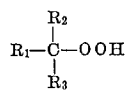

wherein $R_1$, $R_2$ and $R_3$ are as defined above, e.g., cumene hydroperoxide, p-diisopropylbenzene monohydroperoxide, etc. This latter method is not preferred, however, because of the fact that only low yields of peroxide are obtainable. It is illustrated by the following example wherein dihydro-α-terpineol is utilized as a reactant to produce a peroxide in which R of the generic formula is

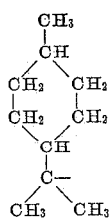

EXAMPLE 10

Into the same reaction vessel employed in Example 1, there was placed 30.5 parts of 98.1% cumene hydroperoxide, 69.1 parts of dihydro-α-terpineol and 1 part of p-toluene sulfonic acid monohydrate. The mixture was stirred and heated to 75° C. and a temperature of 71–78° C. maintained for 6 hours. Analysis at this time indicated that 97.5% of the hydroperoxide had reacted. The reaction mixture was diluted with 140 parts of petroleum ether and washed with five 100-part portions of aqueous 10% NaOH solution and five 100-part portions of water. All volatile material was removed by distillation at a temperature of 89° C. and at a pressure of 0.06 mm. of mercury while sparging with nitrogen. The undistilled residue amounted to 9.5 parts. Analyses by the iodine liberation method indicated the presence of 1.55% cumene hydroperoxide and 3.40% peroxide-active oxygen. This latter value indicated the presence of 61.6% p-menthyl (α,α-dimethylbenzyl) peroxide, a conversion of 10.2%.

In utilizing the peroxides of the invention as vulcanizing agents for rubber, the peroxides are blended with the rubber by conventional compounding techniques in an amount ranging from about 0.1 to 10% peroxide based on the weight of rubber. Vulcanization is then accomplished by conventional techniques by heating to a temperature from about 275 to 350° C.

In addition to being useful as vulcanizing agents for natural and synthetic rubber, the peroxides of the invention also find use as catalysts for the copolymerization of unsaturated polyester resins with monomeric materials such as styrene. To illustrate, a composition comprising 67 parts propylene glycol-fumarate-phthalate, 33 parts styrene and 0.36 part of p-menthyl (α,α-dimethylbenzyl) peroxide (Example 2) cured to a hard solid mass in approximately 5 minutes when heated to a temperature of 150° C.

The peroxides of the invention are also useful as catalysts for the polymerization and copolymerization of vinyl compounds such as vinyl chloride, vinylidene chloride and vinyl acetate as well as acrylic compounds such as acrylonitrile, acrylic acid, methyl methacrylate and the like; and as agents for effecting the cross-linking of polyethylene.

The peroxides additionally are useful as vulcanizing agents for rubber latex in the liquid state. In this state a quantity of peroxide is dispersed in latex, which can be either natural rubber latex or a synthetic rubber latex, such as Buna N latex, and vulcanization is effected by heating the latex prior to coagulation. Unlike sulfur vulcanization of latex, the peroxides require no auxiliary curatives. To facilitate dispersion of the peroxide in the latex, the peroxide can be emulsified in water and added to the latex in this form.

This application is a continuation-in-part of my co-pending application Serial No. 538,787, filed October 5, 1955, and now abandoned.

What I claim and desire to protect by Letters Patent is:

1. An organic peroxide of the formula:

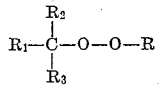

where $R_1$ is an aryl hydrocarbon radical, $R_2$ and $R_3$ are selected from the group consisting of hydrogen and alkyl radicals of less than 4 carbon atoms and R is selected from the group consisting of pinanyl and p-menthyl radicals.

2. The organic peroxide of claim 1 in which R is pinanyl.

3. The organic peroxide of claim 1 in which R is p-menthyl.

4. p-Menthyl($\alpha,\alpha$-dimethylbenzyl) peroxide.

5. Pinanyl ($\alpha,\alpha$-dimethylbenzyl) peroxide.

References Cited in the file of this patent
UNITED STATES PATENTS

| | | |
|---|---|---|
| 2,403,758 | Rust et al. | July 9, 1946 |
| 2,522,016 | Denison et al. | Sept. 12, 1950 |